Feb. 6, 1962 F. H. OWENS 3,020,341

STEREOSCOPIC TELEVISION

Filed Dec. 21, 1951 6 Sheets-Sheet 1

INVENTOR.
FREEMAN H. OWENS
BY
Philip S. McLean
ATTORNEY

INVENTOR.
FREEMAN H. OWENS
BY
Philip S. McLean
ATTORNEY

INVENTOR.
FREEMAN H. OWENS
BY
Philip S. McLean
ATTORNEY

Feb. 6, 1962 F. H. OWENS 3,020,341

STEREOSCOPIC TELEVISION

Filed Dec. 21, 1951 6 Sheets-Sheet 4

INVENTOR.
FREEMAN H. OWENS
BY
Philip S. McLean
ATTORNEY

STEREOSCOPIC TELEVISION

Filed Dec. 21, 1951 6 Sheets-Sheet 5

INVENTOR.
FREEMAN H. OWENS
BY
Philip S. McLean
ATTORNEY

Feb. 6, 1962 F. H. OWENS 3,020,341

STEREOSCOPIC TELEVISION

Filed Dec. 21, 1951 6 Sheets-Sheet 6

INVENTOR.
FREEMAN H. OWENS
BY
Philip S. McLean
ATTORNEY 3,020,341

STEREOSCOPIC TELEVISION

Freeman H. Owens, 600 W. 116th St., New York, N.Y.

Filed Dec. 21, 1951, Ser. No. 262,818
2 Claims. (Cl. 178—6.5)

The invention herein disclosed relates to the production of stereoscopic effects in television.

The general objects of the invention are to provide a commercially practical method and system for televising, transmitting and viewing which will give to the observer the desired sense of depth or perspective.

More specific objects of the invention are to accomplish all this with simple apparatus adapted both to studio operations where the pictures are taken and to home conditions or other places where the pictures are viewed.

Special objects of the invention are to provide a system adapted to the showing of the full variety of subjects ordinarily handled in the studio, such as live action, stills, cards and slides, motion pictures and the like, and which can be immediately shifted, faded, dissolved or otherwise changed from the one subject to another, as may be required.

Further special objects of the invention are to obtain accurate and natural depth effects in television without strain on the eyes of the observer.

Other special objects of the invention are to provide a stereoscopic television system which will utilize equipment found practical in present television operations and which may be modified and otherwise changed and combined to accomplish the novel results here attained.

Other desirable objects and the novel features through which the purposes of the invention are attained are set forth or will appear in the course of the following specification.

The drawings accompanying and forming part of the specification illustrate a number of different embodiments of the invention. Structure, arrangement and operations, however, may be further modified and changed, all within the true intent and broad scope of the invention as hereinafter defined and claimed.

FIG. 1 in the drawings is a plan and generally diagrammatic view of the studio equipment for stereoscopic televising of live action and for the projection of stills and motion picture film. In this view the stereoscopic studio camera for taking the live action and the stereoscopic still projectors and stereoscopic film projectors are all focused on the mosaic of the one television camera appearing at the extreme right, and the film projector at the bottom, right, is the one indicated in action.

Figures 11, 12:
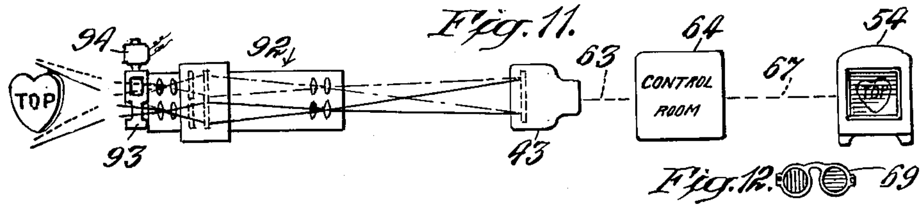

FIG. 11 is a diagrammatic plan view illustrating stereoscopic viewing of the object at the left with the rotary shutter creating alternate, laterally displaced images projected through separate lens systems onto the mosaic of a single television camera and transmitted to and through a control room finally to a television receiver, there appearing in perspective when viewed with the set of polarized light filters shown in FIG. 12.

FIG. 12 is a front elevation of polarized light filters for use with the stereoscopic television receiver shown in FIG. 11.

Figure 13:
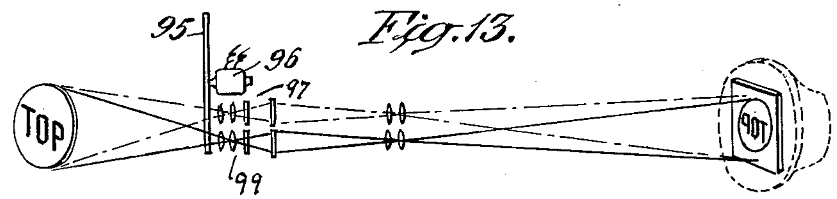

FIG. 13 is a diagrammatic plan view illustrating substitution of a rotary disc shutter also driven by synchronous motor, in place of the tubular type shutter previously referred to.

Figures 14, 15, 16:
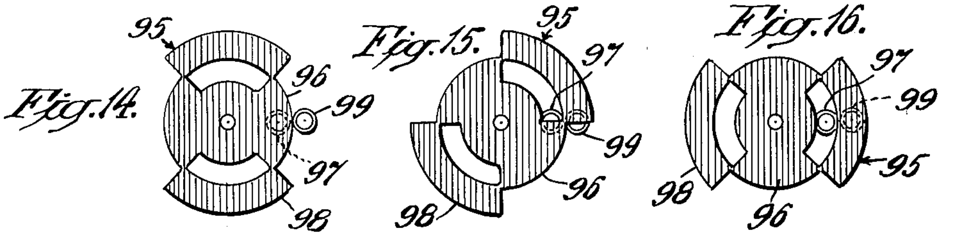

FIGS. 14, 15 and 16 are front views of the disc shutter of FIG. 13, showing first cut-off of the left-hand lens, then partial cut-off of both lenses and then cut-off of the right hand lens, for getting alternate, laterally displaced images with the intermediate overlap or partial dissolving from one into the other.

Figures 17, 18:
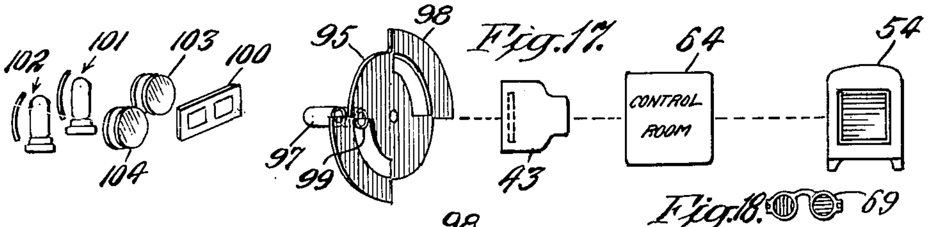

FIG. 17 is a perspective view of a projection system employing two lights and producing stereoscopic images on the mosaic of the television camera with transmission to control room and to stereoscopic receiving set.

FIG. 18 is a detail of the polarized light filters used with the receiver.

Figure 19:
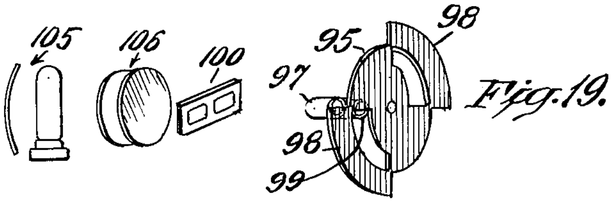

FIG. 19 is a perspective view similar to FIG. 17, showing operations as conducted with a single light source.

Figure 20:
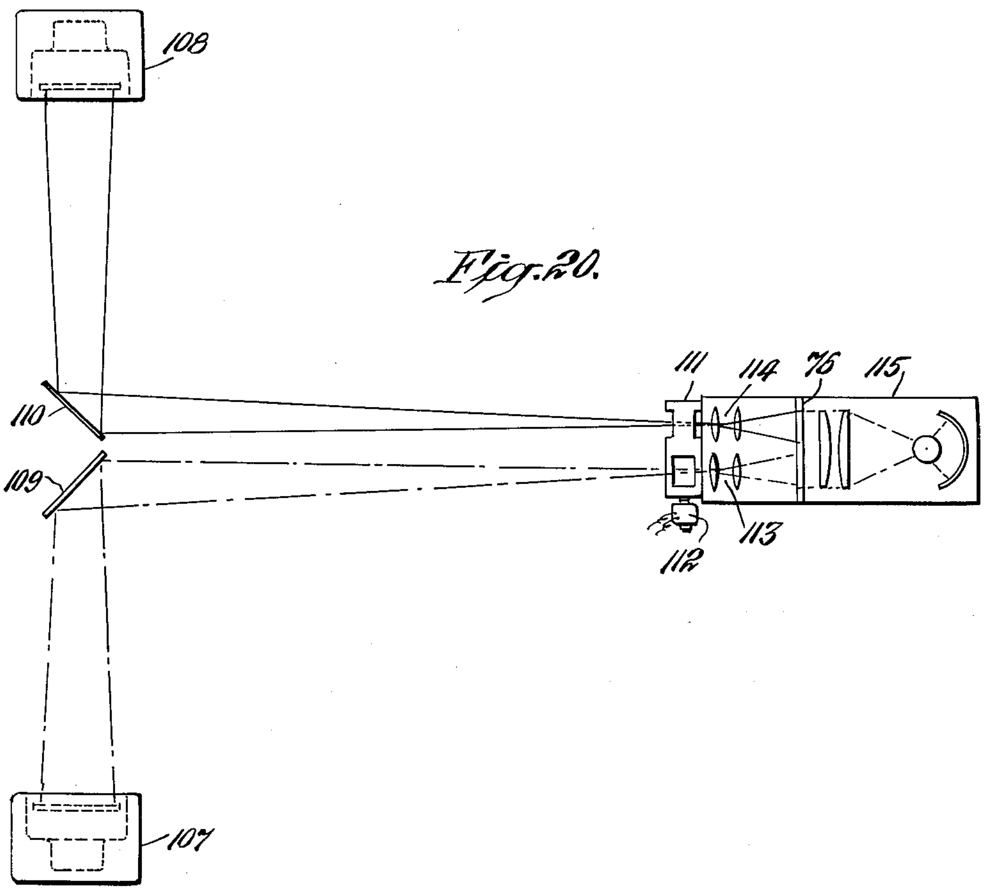

FIG. 20 is a diagrammatic plan view showing how a single stereoscopic projector may be used with a synchronous shutter, reflectors and two television cameras to produce the alternate even and odd scanning lines for television.

Figure 21:
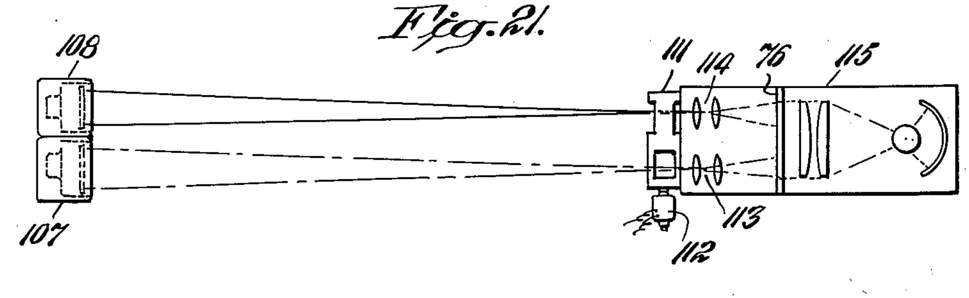

FIG. 21 is a similar view showing how the same interlacing effect may be obtained directly without the use of reflectors.

Figures 22, 23, 24, 25:
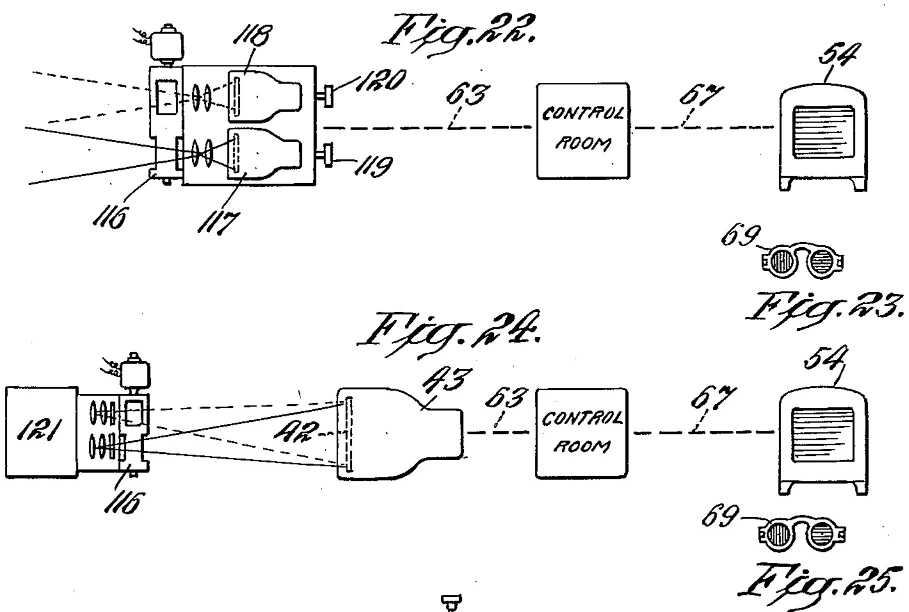

FIG. 22 is a diagrammatic plan view of a stereoscopic camera with alternate image shutter and transmission connections through control room to stereoscopic television receiver.

FIG. 23 is a detail showing the set of polarizing filters to be used with the receiver.

FIG. 24 is a diagrammatic plan view of a motion picture or still projector with synchronously operating shutter for the alternate displaced images, television camera, control room and stereoscopic television receiver.

FIG. 25 is a detail view of the polarized filters required for viewing the stereoscopic images of the receiver.

Figures 26, 27, 28:
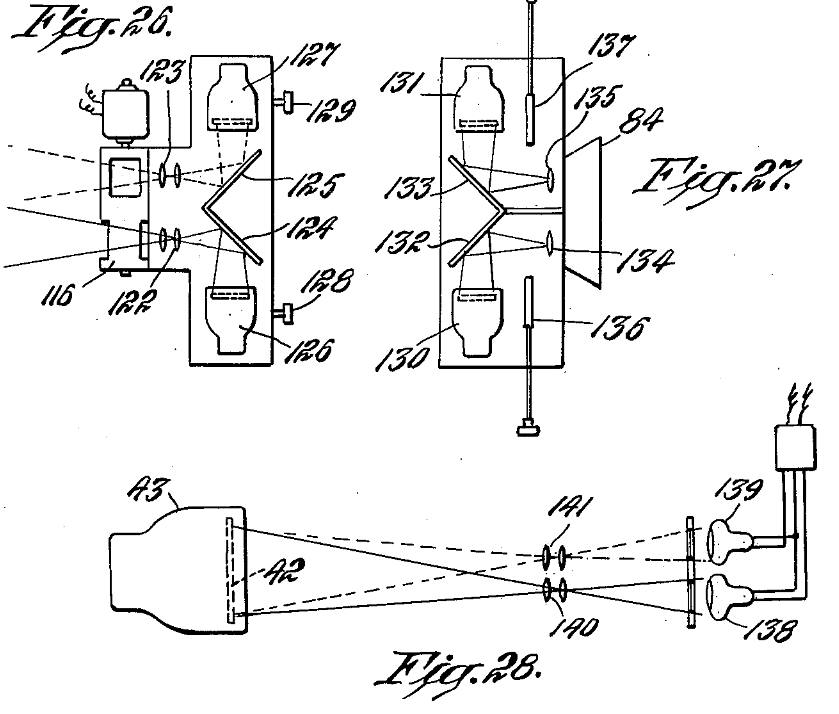

FIG. 26 is a diagrammatic plan view of a television camera with alternating picture shutter, reflectors and the mosaics of separate, odd and even line interlacing tubes, illustrating the knobs for independently focusing the two tubes.

Figure 8:
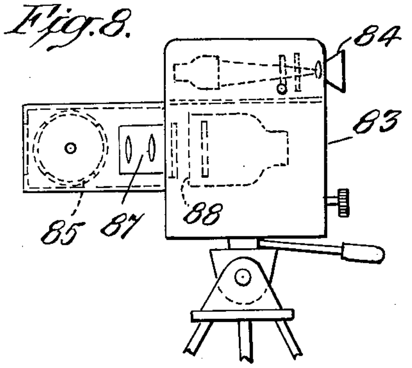
FIG. 8 is a broken side elevation of a television camera for taking the stereo pictures, with a view finder, polarized filters and shutter and having a single iconoscope tube.

FIG. 27 is a diagrammatic plan view of a view finder for a television camera like that shown in FIG. 8 but utilizing two tubes and two lenses, with shutters for cutting off one or the other tube and lens.

FIG. 28 is a diagrammatic illustration of a stereoscopic projector operating in conjunction with a single mosaic and involving alternately flashing pulse lights in place of a rotating shutter.

Figures 1, 2, 3:
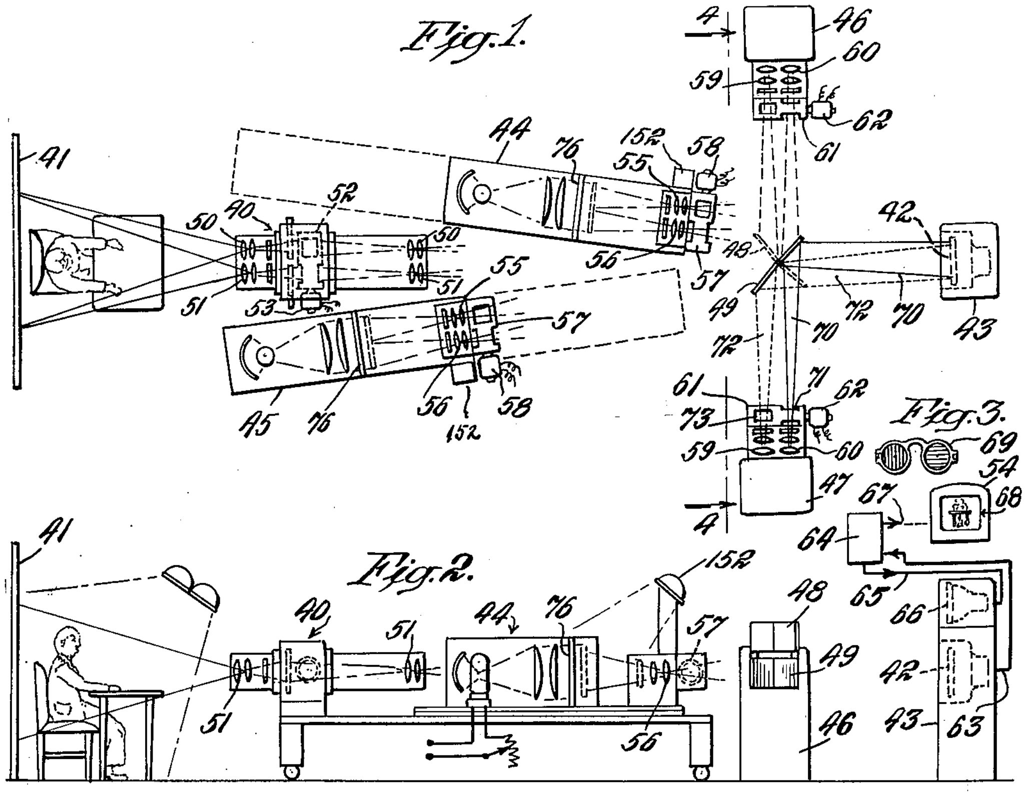
FIG. 2 is a partly diagrammatic and side elevation view of the same apparatus, omitting the lower film projector shown in FIG. 1 and indicating at the right electrical connections from the television camera through the control room back to the monitor, and the radio or other transmission connections to a television receiver.
FIG. 3 is a front elevation of a pair of polarized light filters adapted to be worn by an observer of the television receiver.
Figure 29:
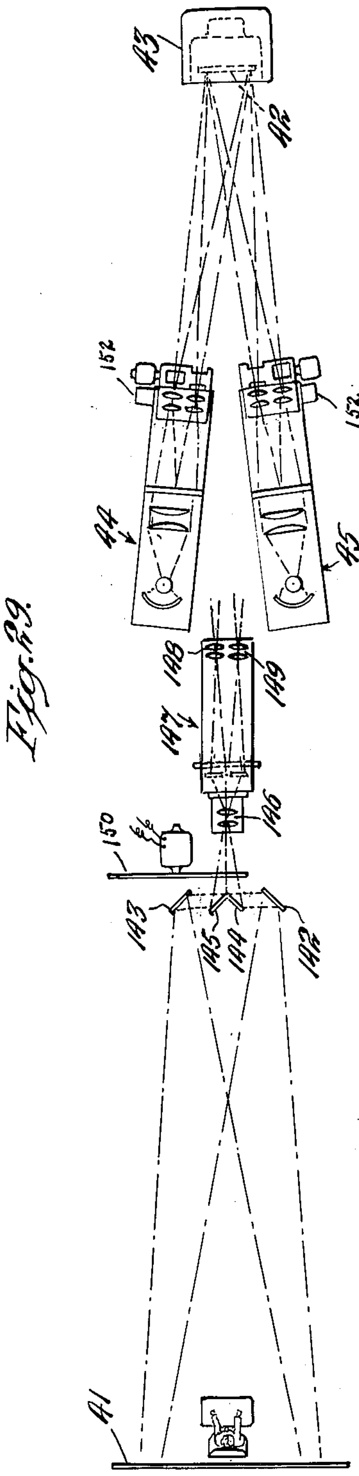

FIG. 29 is a diagrammatic plan view comparable to FIG. 1, illustrating a variation with displaced reflectors, synchronously rotating alternate image disc shutter, condenser and lenses transmitting stereo images to the mosaic of the single television camera.

Figures 30, 31:
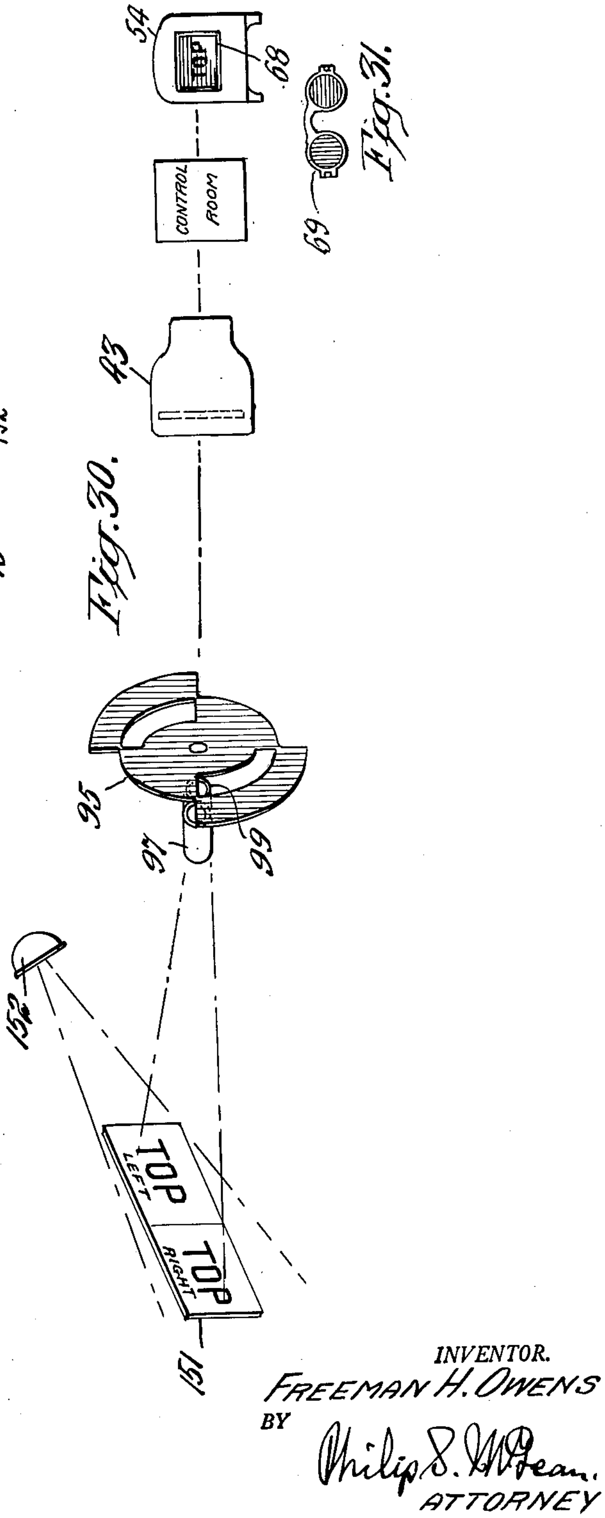

FIG. 30 is a diagrammatic view showing how the pictures of opaque stereo pairs may be projected alternately by the rotating shutter onto the mosaic of the television camera and thence through the control room to the stereoscopic television receiver. This provides for the viewing of old stereoscope pictures.

FIG. 31 is a detail illustration of the polarized filter set required for viewing the stereoscopic pictures.

Figure 32:
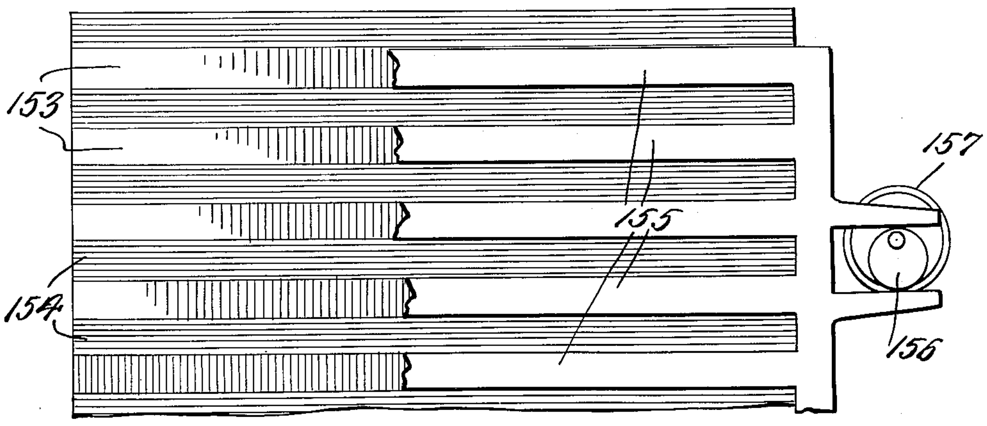

FIG. 32 is a diagrammatic view of the polarizing shutter which separates the displaced images alternately appearing on the screen of the television receiver, this view showing the screen with oppositely polarized, alternating horizontal strips and the vibrating shutter grid which for each complete reciprocation will uncover first one set of polarized strips and then the other set of oppositely polarized strips to create the two displaced images on the television screen for each complete scanning cycle.

Figure 33:
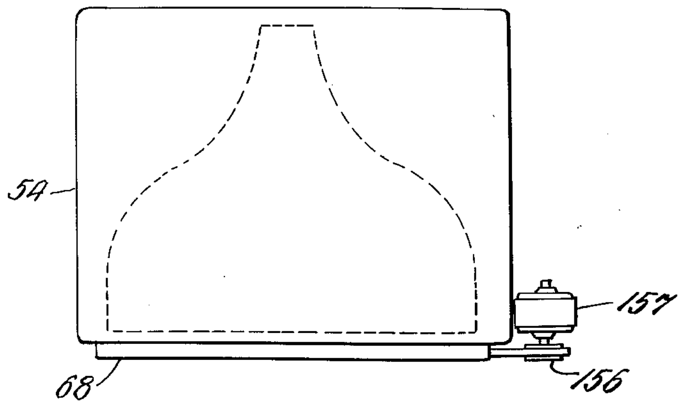

FIG. 33 is a plan view to show how the polarizing shutter may be placed directly in front of the television screen.

The studio equipment as particularly shown in FIGS. 1 to 4, may be arranged as disclosed in copending patent application Serial No. 236,114, filed July 11, 1951, issued May 15, 1956, as Patent 2,745,901 with what may be termed a studio camera 40 located in line with a stage at 41 to take live action and project it directly onto the mosaic 42 of a television camera 43, with still projectors 44, 45, for cards, slides, transparencies and the like at opposite sides of the studio camera and directed on convergent lines at the mosaic of the same television camera and with film projectors 46, 47, at opposite sides of the direct light path and arranged to project by oppositely angled reflectors 48, 49, onto the mosaic of this same television camera.

In the present instance, however, each of the instrumentalities mentioned is of stereoscopic design arranged to take or project alternate left and right or laterally displaced views of the subject matter and to present these views alternately on substantially the same area or field of the mosaic of the television camera.

Thus the studio camera 40 is shown as having laterally displaced lens systems 50, 51, alternately opened and closed by a rotating tubular shutter 52 driven by a motor 53 synchronized with the scanning rate of the television camera 43 and the television receiver which is indicated at 54 in FIG. 2.

Similarly, the still projectors 44, 45, have duplicate lens systems 55, 56, alternate cut-off shutters 57 driven by synchronized motors 58, and the film projectors 46, 47, have double lens systems 59, 60, and alternate cut-off shutters 61 operated by synchronous motors 62. Thus these instruments may be selectively used to project stereo image pairs alternately onto the mosaic of the television camera, using varied subjects such as live action, cards, slides, transparencies, motion picture film and the like.

The still projectors 44, 45, may be constructed as disclosed in the patent application above identified, to project either opaque or transparent subjects.

FIG. 2 shows at the right how the alternate, displaced images constituting a stereo pair, picked up by the television camera 43, may be transmitted by connections 63 to a control room 64 and back by connections 65 to a monitor 66 and be telecast at 67 to more or less distant television receivers 54.

At the receivers the displaced images are separated by a polarizing filter or shutter 68 so that when viewed through a pair of similarly polarized filters such as indicated at 69, FIG. 3, the two separate polarized pair of stereo pictures constituting a single frame will be seen, one through the left eye and the other through the right eye, and with speed sufficient for persistence of vision, the two images will be coalesced and merged into a single form having the appearance of depth or perspective.

This same effect may be obtained at the monitor 66 by using a polarizing filter there, such as the one designated 68, and by viewing through a pair of the polarizing filters 69.

The reflectors 48 and 49 for the stereo film projectors are angled as indicated in FIG. 1, to alternately reflect the laterally displaced images from the films directly onto the mosaic of the television camera. The full lines 70 in FIG. 1 show the right-hand image being projected through right-hand opening 71 in the shutter of the projector 47, the adjoining broken lines 72 indicating the projection beam of the left-hand image which will project the companion left-hand picture when the aperture 73 at the left-hand end of the shutter reaches the open position.

Figure 4:
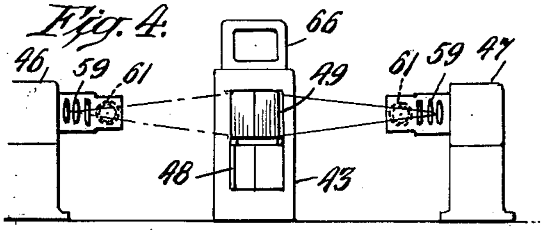
FIG. 4 is a cross sectional diagrammatic view on substantially the plane of line 4—4 of FIG. 1, looking toward the television camera and the monitor on top of it.

FIGS. 2 and 4 illustrate the point that when one film projector is in service the reflectors for that projector will be lined up with that projector and with the television camera, as reflectors 49 are shown in FIG. 4, and at which time the other set of reflectors 48 for the opposite film projector will be lowered, raised or otherwise shifted out of the projecting path.

Figure 5:
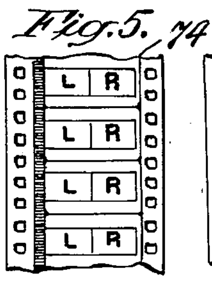
FIG. 5 is a fragmentary front elevation of a section of film such as used in the film projectors shown in FIG. 1, and in which the stereo pairs of pictures marked L and R are arranged for direct projection onto the mosaic of the television camera in the manner generally indicated in FIG. 13.

FIG. 5 illustrates a sample section of film 74 with the left and right or laterally displaced pictures of the stereo pairs arranged in unreversed relation, for use with reflector systems such as shown in FIG. 1.

Figure 6:
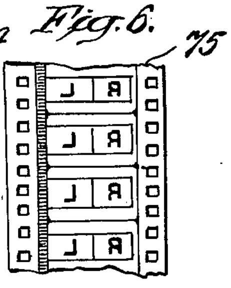
FIG. 6 is a similar view showing the stereo pairs of pictures on the film reversed to compensate for the reversal effected by the reflectors.

With direct projection such as indicated in FIG. 13, the laterally displaced companion pictures may be reversed as shown on the section of film 75 in FIG. 6.

Figure 7:
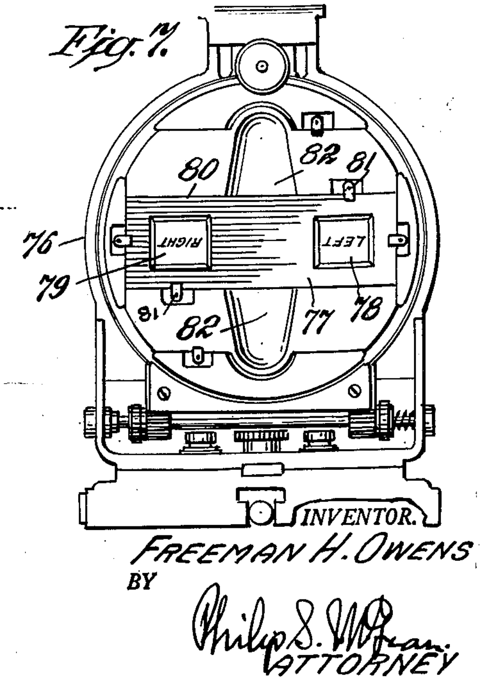
FIG. 7 is a front elevation of a card holder such as used in the still projectors shown in FIG. 1, arranged to hold a card or still carrying a stereo pair of pictures.

FIG. 7 illustrates a holder 76 of the type disclosed in copending patent applications Serial No. 219,680, filed April 6, 1951, and Serial No. 255,806, filed November 10, 1951, Patents 2,704,008, March 15, 1955, and 2,750,444, June 12, 1956, used in the still projectors 44, 45, and arranged to support a card 77 carrying a stereo pair of pictures 78, 79, either transparencies or opaques.

This stereo card is removably secured in the correspondingly shaped seat 80 by turn clips 81, and finger pockets 82 at the center provide for convenient grasping of opposite edges of this card for removal and replacement purposes.

This holder, as disclosed in application Serial No. 219,680, is arranged for vertical and lateral adjustments and has provision for rotary adjustments as well, enabling full, accurate adjustment of the stereo pictures.

FIG. 8 shows a stereo television camera 83 for panning and other operations, the same having a stereo view finder 84, rotary or tubular type shutter 85, lens systems 86, 87, and iconoscope 88.

Figures 9, 10:
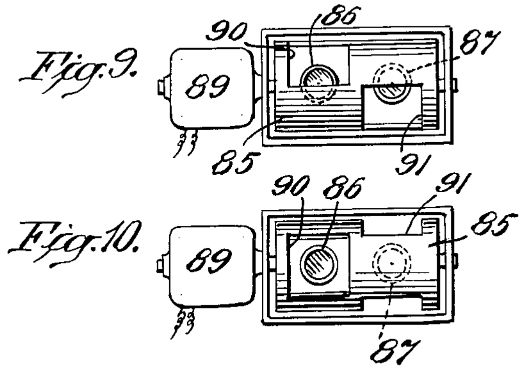
FIGS. 9 and 10 are front elevational views of the rotary, motor driven tubular shutter for taking the alternate, laterally displaced pictures, FIG. 9 illustrating the changeover from one picture to the other with momentary overlap dissolving from one into the other, and FIG. 10 illustrating complete viewing of the one and complete shut-off of the other image.

FIGS. 9 and 10 show the shutter of this camera driven by synchronous motor 89 and having the apertures 90, 91, arranged to create an overlap of lenses as in FIG. 9, prior to the complete cut-off shown in FIG. 10, so as to form a dissolve or merging effect in the change from the one to the other offset picture image.

In FIG. 11 a stereoscopic camera 92 is shown having a double lens system similar to camera 40 in FIG. 1, but arranged with the alternating cut-off shutter 93 driven by synchronous motor 94 ahead of the lens systems, instead of in back of the aerial image, as in FIG. 1.

FIG. 13 illustrates a modification in which a disc shutter 95 operated by synchronous motor 96, is substituted in place of the tubular type shutter.

This disc shutter, as shown in FIGS. 14, 15 and 16, has an inner set of blades 96 to cover and uncover the left-hand lens 97, and an outer set of blades 98 to cover and uncover the right-hand lens 99.

FIG. 15 shows how a limited amount of overlap is provided with this disc shutter at the moment of change from left to right and right to left image.

FIG. 17 illustrates a variation in the projection of transparent stereo pairs such as indicated at 100, involving separate light sources 101, 102, and separate lens systems 103, 104, for the separate images, and employing the disc shutter 95, last described, for alternating the images on the mosaic of the television camera 43.

FIG. 19 shows how a single light source 105 and a pair of large size condensers 106 may be employed to the same effect, with the alternating cut-off disc form of shutter 95.

FIGS. 20 and 21 show how the alternate left and right images of the stereo pairs may be produced with separate left and right television cameras 107, 108, instead of using only the single pick-up camera 43 heretofore described.

In FIG. 20 the two television cameras 107, 108, receive the left and right image impressions from angled reflectors 109, 110, in line with the corresponding opening in the rotary shutter 111 driven by synchronous motor 112 and located in front of lens systems 113, 114 of the projector 115.

FIG. 21 shows how the two television cameras 107 and 108 may be placed directly in front of the stereo projector 115, eliminating need for the inclined reflectors 109, 110.

In both these forms of the invention the separate left and right television cameras 107, 108, will transmit their individual images, through the action of the alternating shutter, alternately, and through the action of the polarizing filters, be seen at the television receiver as a full stereoscopic picture.

Two television cameras may be used in this way for interlacing the scanning lines, one camera being used to take the odd lines and the other camera the even lines, the assembly of odd and even lines being effected in the control room. With the alternating shutter timed to effect the shut-offs twice for each complete scanning frame or instant, usually one-thirtieth of a second, the two displaced images will be projected in that time, one with the odd lines and the other with the even lines, creating the two separate left and right images at a speed more than sufficient for persistance of vision.

FIG. 22 illustrates a stereoscopic camera with rotating shutter 116 synchronized to pick up right and left images on the separate side-by-side iconoscope tubes 117, 118, which are independently focused by knobs 119, 120, and connected with control room and distant receivers, as heretofore.

FIG. 24 illustrates a stereo projector 121 such as for film or still subjects, with dual lens system and rotary synchronized alternating shutter 116 forcused on the mosaic 42 of a television camera 43, with necessary transmission connections to control room and television receivers indicated at 63, 67.

In FIG. 26 there is indicated a stereo television camera having an alternating cut-off synchronized shutter 116 and separate lens systems 122, 123, reflectors 124, 125, and separate line interlacing tubes 126, 127, which can be independently focused by the adjusting knobs 128, 129.

FIG. 27 shows a view finder such as that shown at 84 in FIG. 8, for use in stereo television cameras, and having separate tubes 130, 131, reflectors 132, 133, and lenses 134, 135, with separate shutters 136, 137, by which one or the other tube and lens may be cut off.

FIG. 28 illustrates a variation in which alternately flashing pulse lights 138, 139, are used in place of a rotating shutter, these being laterally displaced and focused through separate lens systems 140, 141, on the mosaic 42 of the television camera 43.

FIG. 29 illustrates a modification of the FIG. 1 disclosure in which the laterally displaced images are obtained from laterally offset, inclined reflectors 142, 143, facing centrally disposed reflectors 144, 145, which are directed into the single lens system 146 of a camera 147 having separate, laterally offset projecting lenses 148, 149, focused on the mosaic 42 of the television camera 43. Alternate cut-off is provided in this instance by synchronously rotating disc shutter 150 interposed between the reflectors and camera.

FIG. 30 shows in diagrammatic fashion how old stereoscopic pictures in side-by-side relation on cards, as indicated at 151, illuminated by spotlights 152 on the still projectors 44, 45, shown in FIG. 1, may be projected with full stereoscopic television effect, using the rotary disc shutter 95 controlling laterally offset lenses 97, 99, as in FIGS. 13, 14.

The polarizing filter for separating the displaced images alternately appearing on the television screen may be constructed as shown in FIG. 32, with a filter screen made up of equal width horizontal strips, one set, 153, polarized in one direction and the other alternately arranged set, 154, polarized in the opposite direction, together with a shutter in the form of a grid having bars 155 of equal width and equally spaced to alternately cover one or the other oppositely polarized sections of the filter screen.

The shutter 155 may be reciprocated by a cam 156 or similar mechanism operated by a synchronous motor 157, at a speed in conformity with the scanning rate such that one set of polarized filter screen strips will show the odd lines and the other, oppositely polarized set of filter screen strips will carry the even lines of the interlacing system.

This separation of the interlaced images on the television screen will be visible to the eyes of an observer using the corresponding oppositely polarized glasses shown in FIGS. 3, 12, 18, 23, 25 and 31, as a stereoscopic picture. Without these glasses the stereo pairs of images separated by the polarizing shutter will be seen as a usual television picture, the variation from the usual depending to an extent upon the contrast between the stereo images separated by the polarizing shutter, which the eyes will see as one picture.

Instead of reciprocating the grid-like shutter, the screen carrying the oppositely polarized strips may be reciprocated, and both shutter and screen may be reciprocated.

The polarizing shutter may be made up as a unit which can be placed over the front of the television screen, substantially as shown in FIG. 33, or it may be built into or otherwise combined with the television receiving set.

The invention, novel in itself, makes use of known and proven principles and equipment.

In particular, the invention utilizes the interlacing scanning principle used in conventional television systems, taking advantage of the double scanning effect with first one set of lines, say the odd lines and then the other or even set of lines, to get first one picture and then the other picture of the stereo pair. These pictures appearing in succession on the screen of the television receiver are there separated by the polarizing filter and seen through the corresponding polarized filters as a composite, solid appearing stereoscopic picture.

By the addition of the polarizing shutter, ordinary television receivers may be converted to stereoscopic receivers. The stereoscopic images telecast in this system may be received on an ordinary television receiver even though not equipped with the polarizing shutter.

The polarizing shutter for creating the successive laterally displaced images of the stereo pairs at the receiver may be mechanical or electrical or a combination of mechanical and electrical as will be clear from the foregoing.

What is claimed is:

1. The method of effecting stereoscopic television comprising alternately creating overlapping, laterally displaced, non-polarized images of stereo pairs of a subject at the rate of a pair to a television scanning frame, alternately electrically transmitting and translating each pair of the same into alternate, interlaced odd and even image forming lines of a television frame, oppositely polarizing the images produced by the odd and even scanning lines and alternately viewing the reproduced polarized images in correspondingly polarized relation.

2. The method of effecting stereoscopic television comprising dissolving a nonpolarized image of one stereo pair into the other nonpolarized image of the same stereo pair and alternately transmitting and translating the images of each stereo pair into alternate interlaced odd and even reproduced image forming lines of a television frame, polarizing said image forming reproductions to opposite effect and alternately viewing said oppositely polarized odd and even line reproductions in correspondingly polarized relation.

References Cited in the file of this patent

UNITED STATES PATENTS

| | | |
|---|---|---|
| 2,107,464 | Zworykin | Feb. 8, 1938 |
| 2,301,254 | Carnahan | Nov. 10, 1942 |
| 2,349,071 | Baird | May 16, 1944 |
| 2,384,260 | Goldsmith | Sept. 4, 1945 |
| 2,408,115 | Varian | Sept. 24, 1946 |
| 2,417,446 | Reynolds | Mar. 18, 1947 |
| 2,508,920 | Kell | May 23, 1950 |
| 2,571,612 | Rines | Oct. 16, 1951 |
| 2,578,298 | Goldsmith | Dec. 11, 1951 |
| 2,621,247 | Wright | Dec. 9, 1952 |
| 2,665,335 | Cahen | Jan. 5, 1954 |

FOREIGN PATENTS

| | | |
|---|---|---|
| 325,362 | Great Britain | Feb. 20, 1930 |
| 571,946 | Great Britain | Sept. 17, 1945 |